UNITED STATES PATENT OFFICE.

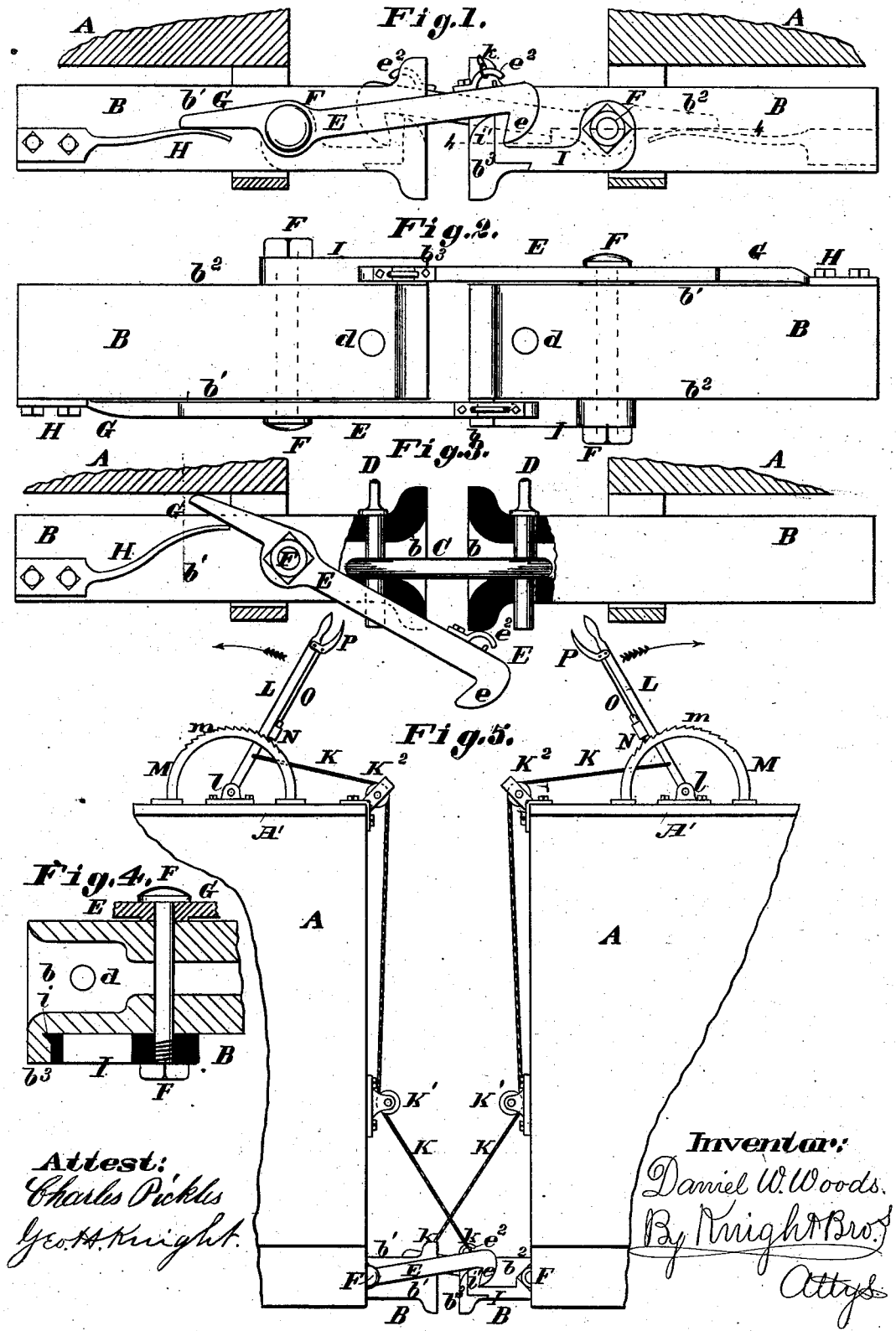

DANIEL W. WOODS, OF ST. LOUIS, MISSOURI.

CAR-COUPLING.

SPECIFICATION forming part of Letters Patent No. 260,725, dated July 4, 1882.

Application filed March 18, 1882. (No model.)

*To all whom it may concern:*

Be it known that I, DANIEL W. WOODS, of the city of St. Louis, in the State of Missouri, have invented a certain new and useful Improvement in Car-Couplings, of which the following is a full, clear, and exact description, reference being had to the accompanying drawings, forming part of this specification.

My invention relates to the class of self-coupling car-couplings that may be used where the adjoining car has the common draw-head.

In the drawings, Figure 1 is a side view of parts of two draw-heads, showing my improvement. Fig. 2 is a top view of same. Fig. 3 is part in side view and part in vertical section, showing the device in use with the ordinary coupling link and pins. Fig. 4 is a detail horizontal section of part of one draw-head at 4 4, Fig. 1. Fig. 5 is a side view of parts of two cars and draw-heads.

Parts of two car-bodies are shown at A A. The draw-heads B are made with a suitable funnel-mouth, $b$, to receive the end of a coupling-link, C, and with the usual vertical pin-holes, $d$, for the coupling-pin D. Each draw-head is made flat upon one side, $b'$, and to this side is pivoted a coupling-bar, E, having at the outer end a downwardly-projecting hook, $e$, that engages on a catch upon the side of the draw-head of the other car. The coupling-bar is connected to the side $b'$ of the draw-head by a pivot-bolt, F, passing horizontally through the draw-head from side to side.

G is a toe of the bar E, projecting rearward from the bolt F, and having bearing on a spring, H, which tends to hold up the toe G, and to hold the hook $e$ down upon the catch of the other draw-head.

I have shown a flat spring attached to the side of the draw-head; but I do not confine myself to any particular kind or construction of spring. Any spring tending to depress the hook $e$ would be a mechanical equivalent of the spring H.

The side $b^2$ of the draw-head is cast with a projection, $b^3$, extending sidewise from its end and forming the end bearing of the catch-block I. The outer end of the catch-block I is fitted to the projection $b^3$ with a dovetail joint or dowel-stud, $i$, Fig. 4, which holds the outer end of the catch-block firmly in place. The inner end of the catch-block is held fast to the side of the draw-head by the bolt F and a nut thereon.

The catch on which the hook $e$ engages is shown at $i'$.

It will be understood that the two draw-heads and coupling devices are duplicates, the coupling-bar E of each engaging on the catch $i'$ of the other.

At the top of each coupling-bar E is a hook, $e^2$, receiving the ring or link $k$ at the lower end of the line or chain K, that extends to the roof A' of the car. The upper end of the chain or line K is attached to a hand-lever, L. The lever L is fulcrumed to the car-roof at $l$, and plays beside an arched ratchet-bar, M, having ratchet-teeth $m$. The lever L has a sliding dog, N, that engages the ratchet-teeth to hold back the upper end of the lever from moving toward the end of the car.

In place of the ratchet-teeth, the bar M may have a number of notches to receive the edge of the dog and prevent the lever from moving in either direction until the dog is raised. The dog is raised by a bell-crank lever, P, and connecting-rod O. The line or chain K is shown working against rollers K' K².

The operation of the device is as follows: To arrange the coupling-bars E for coupling as the cars approach each other, the levers L are placed in the position shown in Fig. 5, so that the coupling-bars are sustained by the lines or chains K in position for their hooks $e$ to slide over the catches $i'$ and to drop again, so as to engage upon them, as shown in Fig. 5. To uncouple, the levers L are moved back in the direction of the arrows to lift up the hooked ends $e$ of the coupling-bars and disengage the hooks $e$ from the catches $i'$. When the levers are drawn backward (in the direction indicated by the arrows) they are held in their backward position by the dog N and ratchet-teeth $m$, and then the cars may be brought together without coupling. When (as in the case of one of the draw-heads being of the ordinary kind) it is desired to use the ordinary link and pins, the ring or link $k$ is disconnected from the hook $e'$, and the outer ends, $e$, of the coupling-bar allowed to drop down into the position shown in Fig. 3. In this figure only one of the draw-heads is shown with my device, and, in fact, there would be no reason for the use of the common coupling link and pins where both draw-heads have my improved device, as shown in the other figures.

I claim as my invention—

1. The combination of a draw-head having side projection, $b^3$, catch-block I, having dowel-stud $i$, and securing-bolt F, as set forth.

2. The combination of a draw-head having side projection, $b^3$, catch-block I, having dowel-stud $i$, gravitating coupling-bar E, having toe G, a spring, H, and a bolt, F, forming a pivot for the coupling-bar, and the means for securing the catch-block, as set forth.

3. The combination of the draw-head, having gravitating coupling-bar E, the line or chain K, arched ratchet-bar M $m$, lever L, and dog N, adapted to hold the coupling-bar in desired position for coupling.

4. The gravitating coupling-bar E, having hook $c^2$ for ready disengagement of the supporting line or chain, as set forth.

DANIEL W. WOODS.

Witnesses:
SAML. KNIGHT,
GEO. H. KNIGHT.